Patented Apr. 30, 1935

2,000,003

UNITED STATES PATENT OFFICE 2,000,003

PREPARATION OF PIGMENTS

Albert E. Verbyla, Elizabeth, N. J., assignor to Standard Varnish Works, a corporation of New York No Drawing. Application December 10, 1932, Serial No. 646,709

10 Claims. (Cl. 134—58)

The preparation of pigments for use in film-forming compositions such as paints, varnishes and the like, has been recognized for many years to be an expensive operation ordinarily demanding a long, slow grinding in a liquid vehicle which ordinarily is selected as being of a type used in final film-forming composition. The present invention relates to a method of preparing pigments whereby they can be incorporated in the final composition with great ease and permits the production of these pigments in a substantially dry, solid form so that they can be shipped or handled in bulk without the use of liquid-proof containers. Ordinarily pigments are sold in very finely divided state and handling them demands special precautions to prevent the spread of dust. Pigments prepared in accordance with my invention can be handled in the form of lumps or small pieces, as it is not necessary to reduce the pigment to an impalpable powder before incorporating it in the final mix.

Broadly speaking, my invention consists in causing the pigment to combine with a thermoplastic resinous material of a type suitable for use in a film-forming compound, such for example as a paint, enamel, lacquer or varnish, and which can be easily dissolved in a solvent such as may be used in such a compound. If the combination or blending is properly accomplished, with the pigment thoroughly disseminated in minute particles through the resin to form an apparently homogeneous mass, I have found that subsequently upon the addition of a solvent for the resin, as the resin is dissolved the pigment is wetted and becomes most efficiently dispersed throughout the solution. In order to accomplish such an intimate mixture of the resin and pigment (that is, in order to get a sufficient breaking down of the pigment aggregates) the resin must be in the proper state and to this end the temperature is so controlled that the thermoplastic material is in the condition where it shows a plasticity such that separated pieces will recoalesce when pressed together (so that the resin will not break into a powder) but will still be relatively stiff. While the first limitation that the parts must reunite under pressure is essential, considerable margin exists towards the softer limit. However, experience has shown that better results are obtained where the material is stiff enough to have appreciable tensile strength than where it is very soft and easily pulled out of shape. A good working test for the condition of the resin is that it must be capable of being dragged and drawn out and yet is stiff enough so that there will be an appreciable tendency for the temperature to rise during the mixing, as a result of frictional heat. The condition so defined is herein termed "stiffly plastic." With the resinous material in this condition, the pigment is incorporated with it by a severe mixing, kneading, shearing and grinding action which breaks up the lumps or aggregates of the pigment and coats the resulting fine particles with the resin but causes the whole to coalesce into an apparently homogeneous mass. This action which can be attained by certain types of mixing mills now on the market such for example as that shown in U. S. Patents Nos. 1,200,070 and 1,227,522 is far more strenuous than a simple mixing and kneading and will of itself develop a substantial amount of frictional heat in the material under treatment which must be taken into account in connection with the temperature control. Thus while external heating of the mixer may be necessary in some cases, in others, as where the resin softens very readily or is thermo-setting as well as thermo-plastic, proper temperature control may demand cooling to remove some of the generated heat. Solvents or softening agents may be used to a limited extent to assist in softening the resin but the amount of solvent ordinarily used should be small and certainly should not be enough to prevent the final mix from being a firm, substantially rigid mass when cool, for one of the features of my invention is that the product should be one which can readily be broken up into small pieces when cool which avoids the expense of working a solvent into a tenacious plastic mass.

The resin employed may be any one of the various resinous materials now employed in film-forming materials, such for example as the synthetic phenolic resins or resins of the glycerol-phthalic-anhydride-fatty acid type, as well as others. Also natural resins such as rosin may be employed or modified natural resins such as the ester gums. It is understood that these types of resins are not intended to be exclusive, but are named merely to indicate that all types of resins that are adapted to be used in film-forming compounds and which can be softened by heat may be employed for my process.

My invention can readily be understood from the following examples which are given by way of illustration:

Example 1.—50 parts by weight of a resin such as synthetic resin of the phenolic type, together with about 2 parts by weight of toluol and 100 parts of finely divided titanium oxide were put in a so-called Banbury mixer which had been heated to a temperature high enough to render the resin plastic. The mixer was started in operation and the operation continued for about 6 minutes, at which time the ingredients were thoroughly commingled and the aggregates of the pigment were substantially broken up and disseminated as individual particles throughout the mass. The mixed product was then found to be a coherent, doughy aggregate which showed little tendency to stick to the metal parts of the mixing apparatus and could readily be removed. Upon being allowed to cool it formed a solid mass.

*Example 2.*—In this example, a procedure similar to that of Example 1 was followed, except that in place of the 100 parts by weight of titanium oxide there was used about 40 parts by weight of carbon black.

In each case the prepared resin-pigment mixture was readily broken into small pieces, and when added to a vehicle used in making film-forming materials as for example naphtha, or a coal-tar solvent such as toluol, the pieces readily decomposed, leaving the pigment distributed with unusual smoothness throughout. As a result the final product had particularly advantageous qualities as regards finish and ease of applicability.

*Example 3.*—In this case ester gum was used as the resinous material without solvent. The proportion of pigment that could be worked in followed closely Examples 1 and 2. In this case no external heat was necessary for the kneading and rubbing action brought the temperature up to about 150° F. where an approximate equilibrium was reached which kept the resin in the desired state of plasticity. When the mixing was completed a mass was obtained that apparently was substantially homogeneous, and which on cooling could readily be broken up.

After being broken into quite small pieces, 3 parts by weight of the mixed mass was dissolved in 2 parts of petroleum naphtha. Solution was readily effected at room temperature with mild agitation, and produced a smooth thin paste, adapted to be incorporated into a varnish. For example, 5 parts of this paste were blended with 4 parts of a 30 gallon China-wood-oil-ester-gum varnish. If preferred, the naphtha and varnish can be mixed before adding the pigment composition where a like result will be obtained though solution may be somewhat delayed.

*Example 4.*—The resin selected was of glycerine-phthalic-anhydride-fatty acid type and was relatively soft. No heat was required and in fact it was found that the heat of friction tended unduly to soften the mass so a part of the heat was withdrawn by the use of water in the jacket so that a temperature was maintained a little above normal room temperature. On cooling the mixed mass while somewhat elastic could readily be broken up.

In all of the foregoing examples it was found that when the resin was dissolved in a vehicle of the type adapted for use in film-forming compositions, the pigment was disseminated in a remarkably smooth manner showing a better quality of product than that produced by the usual grinding. This definitely indicates that the average particle size of the pigment has been reduced to a size adapted for use in film-forming compositions, whereas a simple mixture of the pigment with a vehicle would give no such result as is well known in the art.

The proportions of pigment to resin can of course be varied to a very substantial extent, depending upon the nature of the pigment and resin selected and upon the manner in which the product is to be used. Ordinarily it will be advisable to use approximately the maximum amount of pigment that can be coated and held together by the resin employed and this can readily be ascertained by experiment. However, a somewhat lesser amount of pigment may be used if the presence of a relatively large amount of resin will have no harmful effect on the final compound.

What I claim is:

1. In the process of preparing pigments for use in liquid coating compositions, the steps of submitting such pigment together with a thermoplastic resin to a grinding, shearing, rubbing and mixing action while so controlling the temperature of the mass that the resin will be stiffly plastic and continuing such action until an apparently homogeneous mass is obtained and the pigment aggregates are broken down sufficiently so that if the resin is dissolved in a liquid adapted for use in liquid coating compositions the pigment will be disseminated through the liquid to produce a smoothness appropriate to liquid coating compositions.

2. A process as specified in claim 1, in which the grinding, shearing, rubbing and mixing action is one adapted substantially to raise the temperature of the mixture by the heat of friction.

3. A process as specified in claim 1, in which the grinding, shearing, rubbing and mixing action is adapted substantially to raise the temperature of the mixture by the heat of friction and the temperature is kept down by outside cooling.

4. A process as specified in claim 1 in which the mass is heated both externally and by friction during the mixing operation.

5. A process as specified in claim 1 in which a small amount of liquid material adapted to soften the resin is incorporated therewith during the mixing operation but the amount of liquid so added is insufficient to render the resin fluid.

6. The method of wetting finely divided pigments for use in liquid coating compositions which comprises the steps of mixing the pigment with a thermo-plastic resin soluble in a solvent vehicle of a type customarily used in film-forming compounds while controlling the temperature of the mass so that the resin is stiff but capable of coalescing, continuing such mixing until an apparently substantially homogeneous mass is obtained and the pigment aggregates are reduced to a fineness adapted for use in liquid coating compositions, breaking up such mass and dissolving the resin from about the pigment.

7. A substantially homogeneous, thoroughly kneaded pigment preparation adapted for use in film-forming compounds comprising a finely divided pigment disseminated substantially in the form of individual particles throughout a mass of thermoplastic resin adapted to be readily dissolved in a solvent vehicle of a type customarily used in film-forming compounds the pigment particles having been reduced by a thorough kneading of the resin and the pigment to a size adapted for use in a film-forming compound, so that if such resin is dissolved in a proper vehicle, a smooth, relatively stable suspension of such pigment particles will be formed.

8. A product as specified in claim 7 in which the resin is of the phenol-formaldehyde type.

9. A product as specified in claim 7 in which the resin is of the glycerine-phthalic-anhydride-fatty acid type.

10. A product as specified in claim 7, in which the resin is ester gum.

ALBERT E. VERBYLA.